(12) United States Patent
Gim

(10) Patent No.: US 9,208,146 B2
(45) Date of Patent: Dec. 8, 2015

(54) SYSTEM FOR PROVIDING UNIVERSAL COMMUNICATION THAT EMPLOYS A DICTIONARY DATABASE

(71) Applicant: Sin El Gim, Seoul (KR)

(72) Inventor: Sin El Gim, Seoul (KR)

( * ) Notice: Subject to any disclaimer, the term of this patent is extended or adjusted under 35 U.S.C. 154(b) by 227 days.

(21) Appl. No.: 13/744,213

(22) Filed: Jan. 17, 2013

(65) Prior Publication Data

US 2013/0191114 A1 Jul. 25, 2013

Related U.S. Application Data

(60) Provisional application No. 61/587,618, filed on Jan. 17, 2012, provisional application No. 61/698,209, filed on Sep. 7, 2012, provisional application No. 61/708,584, filed on Oct. 1, 2012, provisional application No. 61/715,294, filed on Oct. 18, 2012, provisional application No. 61/721,446, filed on Nov. 1, 2012, provisional application No. 61/725,469, filed on Nov. 12, 2012, provisional application No. 61/729,611, filed on Nov. 25, 2012, provisional application No. 61/745,322, filed on Dec. 21, 2012.

(30) Foreign Application Priority Data

Dec. 7, 2012 (KR) .................. 10-2012-0141757

(51) Int. Cl.
*G06F 17/28* (2006.01)

(52) U.S. Cl.
CPC .............. *G06F 17/28* (2013.01); *G06F 17/289* (2013.01)

(58) Field of Classification Search
CPC ..................................... G06F 17/289
USPC .............................................. 704/9
See application file for complete search history.

(56) References Cited

U.S. PATENT DOCUMENTS

| | | | | |
|---|---|---|---|---|
| 5,794,177 | A * | 8/1998 | Carus et al. ................. | 704/9 |
| 5,890,103 | A * | 3/1999 | Carus ........................... | 704/9 |
| 7,295,963 | B2 * | 11/2007 | Richardson et al. ......... | 704/2 |
| 7,383,542 | B2 * | 6/2008 | Richardson et al. ......... | 717/137 |
| 8,571,317 | B2 * | 10/2013 | Welling et al. .............. | 382/173 |
| 8,600,735 | B2 * | 12/2013 | Dewulf ........................ | 704/9 |

\* cited by examiner

*Primary Examiner* — Susan McFadden

(74) *Attorney, Agent, or Firm* — Seed IP Law Group PLLC

(57) ABSTRACT

Provided is a system for providing universal communication, by generating a universal communication signal including a frequency component including light, a sound, a language, a dialect, an electromagnetic wave, and a vibration, by recording/storing the generated universal communication signal, and by converting an input signal into a universal communication signal, to enable communication between a human and a communication media or a non-human entity.

28 Claims, 8 Drawing Sheets

US 9,208,146 B2

SYSTEM FOR PROVIDING UNIVERSAL COMMUNICATION THAT EMPLOYS A DICTIONARY DATABASE

U.S. Provisional Application No. 61/587,618, filed on Jan. 17, 2012, U.S. Provisional Application No. 61/698,209, filed on Sep. 7, 2012, U.S. Provisional Application No. 61/708,584, filed on Oct. 1, 2012, U.S. Provisional Application No. 61/715,294, filed on Oct. 18, 2012, U.S. Provisional Application No. 61/721,446, filed on Nov. 1, 2012, U.S. Provisional Application No. 61/725,469, filed on Nov. 12, 2012, U.S. Provisional Application No. 61/729,611, filed on Nov. 25, 2012, U.S. Provisional Application No. 61/745,322, filed on Dec. 21, 2012, and Korean Patent Application No. 10-2012-0141757, filed on Dec. 7, 2012 are each hereby incorporated by reference in their entireties.

BACKGROUND

1. Field of the Invention

Exemplary embodiments relate to a system and method for providing universal communication that may generate a universal communication signal including a frequency component, for example, light, a sound, a language, a dialect, an electromagnetic wave, and a vibration, may record/store the generated universal communication signal. In response to an input signal, the system and method may convert the input signal into a universal communication signal for a human and a non-human entity, for example, an animal, or a binary coded machine language for a computer-controlled entity, for example, a robot and a communication media, for example, a smart phone.

2. Description of the Related Art

Humans recognize a new world through similarities or analogies based on experience, and a desire to expand experiences, for example, by sharing experiences with another human or a non-human entity through a medium.

The similarities or analogies may be represented in a form of a language, a machine code, or symbolic representation. In the linguistic or symbolic representation for expanding the human experience, a variety of sophisticated language barriers between entities present a challenge.

Also, in a case of a computer-readable binary coded machine language, a user with no special knowledge related to an internal structure of a computer fails to deliver a desired instruction or control a computer-controlled entity, for example, a robot, directly.

Accordingly, a need to enable communications between sophisticated language users and between a human and a non-human entity through a singular core system is present.

SUMMARY

According to an aspect of the present invention, there is provided a system for providing universal communication including at least one dictionary database including dictionary information based on a frequency component, and the system may generate and evolve the at least one dictionary database, may generate, in response to an input signal of a first morphological feature, a universal communication signal of a second morphological feature based on setting information using the at least one dictionary database, and may convert the generated universal communication signal into an action signal.

The first morphological feature and the second morphological feature may include one frequency component selected from light, a sound, an electromagnetic wave, a language, and a vibration, and the system may generate the universal communication signal of the second morphological feature including a second frequency component based on the setting information by referring to the dictionary information for a first frequency component of the first morphological feature.

The first morphological feature may include one frequency component selected from light, a sound, an electromagnetic wave, a language, and a vibration, the second morphological feature may include a machine language-based binary code component, and the system may generate the universal communication signal of the binary code component based on the setting information by referring to the dictionary information for a first frequency component of the first morphological feature.

The setting information may include parameter extraction information for setting a parameter for controlling the generation of the universal communication signal or for extracting a parameter for controlling the generation of the universal communication signal from predetermined setting information, and for controlling the extracted parameter, and communication setting information for setting a connection with at least one user and for controlling the conversion into the action signal.

The parameter extraction information may include tuning information for setting the second morphological feature, key setting information for setting the frequency component of the universal communication signal, and dictionary setting information for identifying and controlling the at least one dictionary database, and the communication setting information may include setting identification information for editing and controlling the predetermined setting information, connection setting information for controlling the connection with the system, and state setting information for controlling the conversion of the universal communication signal into the action signal.

The key setting information may include spectrum setting information for setting the second frequency component for the generation of the universal communication signal, modulation setting information for setting frequency modulation for a sine wave and an envelope in a frequency frame of the universal communication signal, mode information for setting a modulation mode of the universal communication signal, and consortium setting information for setting frequency synthesis in the frequency frame of the universal communication signal.

The modulation setting information may include time information of the sine wave and the envelope, frequency information, and texture information of the envelope, in the frequency frame.

The dictionary setting information may include at least one piece of information among definition information for setting axiomatic definition data associated with a symbolic meaning of the frequency component of the universal communication signal, affinity information for setting etymologic affinity data of the axiomatic definition data, meaning information for setting a meaning of the axiomatic definition data, and order setting information for setting syntagma data of the axiomatic definition data.

The tuning information may include selection information of the second morphological feature, range information of the universal communication signal, and synchronization information for setting synchronization between the universal communication signal and the action signal.

The system may further include a central communication processing unit (CCPU) to provide at least one user with a dictionary database list for downloading the at least one dictionary database, and to update the at least one dictionary database using user-created dictionary data received from the at least one user.

The CCPU may control a connection of the at least one user to the system over a communication network, and may control a communication between the at least one user connected to the system.

The system may further include a cloud computing service unit to store and manage one of the at least one dictionary database, the setting information, and the generated universal communication signal, and the CCPU may receive, from the cloud computing service unit, at least one piece of data among the at least one dictionary database, the setting information, information associated with the universal communication signal, the user-created dictionary data, and may content, over the communication network, and provides the cloud computing service unit with related information generated from the at least one piece of data being received.

The system may further include an applicator to generate the universal communication signal of the second morphological feature including one frequency component selected from light, a sound, an electromagnetic wave, a language, and a vibration, based on the setting information using the at least one dictionary database, an activator to sense the input signal, to transmit the sensed input signal to the applicator, and to output the action signal corresponding to the generated universal communication signal, and an adaptor to convert the generated universal communication signal into a signal format corresponding to the action signal.

The applicator may include a parameter extractor to set the parameter for controlling the generation of the universal communication signal, or to extract the parameter for controlling the generation of the universal communication signal from the predetermined setting information and to control the extracted parameter, and a communicator to set the connection with the at least one user and to control the conversion into the action signal.

The parameter extractor may include a key setting unit to set and control the frequency component of the second morphological feature of the universal communication signal, a dictionary setting unit to select the at least one dictionary database and to control the at least one dictionary database being selected, and a tuning unit to set the second morphological feature.

The communicator may include a file setting unit to generate the setting information and to edit and control the generated setting information, a state setting unit to set the conversion of the universal communication signal into the action signal, and a connection setting unit to control the connection with the at least one user.

The applicator may further include a memory unit to store the extracted parameter, the setting information, and the dictionary information.

The applicator may include a modulation/demodulation module to modulate the universal communication signal of the second morphological feature and to demodulate the sensed input signal based on the setting information.

The activator may correspond to a transceiver for at least one stand-alone device, and may be attachable to and detachable from at least one object, and the adaptor may correspond to the at least one stand-alone device corresponding to the at least one activator, respectively, and may convert the generated universal communication signal into a data format corresponding to the action signal and transmits the action signal.

The setting information may include ON/OFF information of an input and an output in the at least one stand-alone device corresponding to the at least one adaptor, respectively.

The activator may include an input module to sense the input signal, and an output module to output the action signal corresponding to the generated universal communication signal.

The dictionary information may include at least one piece of data among at least one axiomatic definition data of the frequency component, at least one combinatory etymologic affinity data of the axiomatic definition data, and at least one syntagma data of the axiomatic definition data.

According to another aspect of the present invention, there is provided a system for providing universal communication including a universal communication provider to generate, in response to an input signal of a first morphological feature, a universal communication signal of a second morphological feature based on setting information using at least one dictionary database including dictionary information based on a frequency component, and to integrate the generated universal communication signal into an action signal, and a dictionary evolution module to set at least one axiomatic definition data of the frequency component, and to construct and evolve the at least one dictionary database including at least one combinatory etymologic affinity data and at least one syntagma data of the axiomatic definition data being set.

The dictionary evolution module may compute a likelihood of second dictionary translation data to first dictionary translation data, the first dictionary translation data and the second dictionary translation data being produced by performing a translation process on first dictionary data and second dictionary data, respectively, based on the dictionary information of the at least one dictionary database, may extract an axiom or affinity between the first dictionary data and the second dictionary data based on the computed likelihood, and may evolve the first dictionary data to the second dictionary data to evolve the at least one dictionary database.

The dictionary evolution module may include a recognition unit to extract and recognize the frequency component, a definition unit to set the axiomatic definition data of the extracted frequency component, an affinity analysis unit to analyze the etymologic affinity data of the axiomatic definition data being set, a meaning setting unit to set a meaning of the axiomatic definition data being set, and an order analysis unit to analyze the syntagma data of the axiomatic definition data being set.

The etymologic affinity data may include derivation information and usage information of the axiomatic definition data.

The system may further include a storage unit to store at least one piece of information among a user identification (ID) of at least one user, location information or dictionary ID of the at least one dictionary database, the dictionary information, and the generated universal communication signal.

According to still another aspect of the present invention, there is provided a system for providing universal communication, including at least one dictionary database including dictionary information based on a frequency component, and the system may generate and evolve the at least one dictionary database, generates a universal communication signal of a morphological feature including one frequency component selected from light, a sound, an electromagnetic wave, a language, and a vibration, based on setting information using the at least one dictionary database, and may integrate the generated universal communication signal into an action signal.

According to still another aspect of the present invention, there is provided a system for providing universal communication, including a universal communication provider to generate a universal communication signal of a morphological feature including one frequency component selected from light, a sound, an electromagnetic wave, a language, and a vibration based on setting information using at least one dictionary database including dictionary information based on the frequency component, and to integrate the generated universal communication signal into an action signal, and a dictionary evolution module to set at least one axiomatic definition data of the frequency component, and to construct and evolve the at least one dictionary database including at least one combinatory etymologic affinity data and at least one syntagma data of the axiomatic definition data being set.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
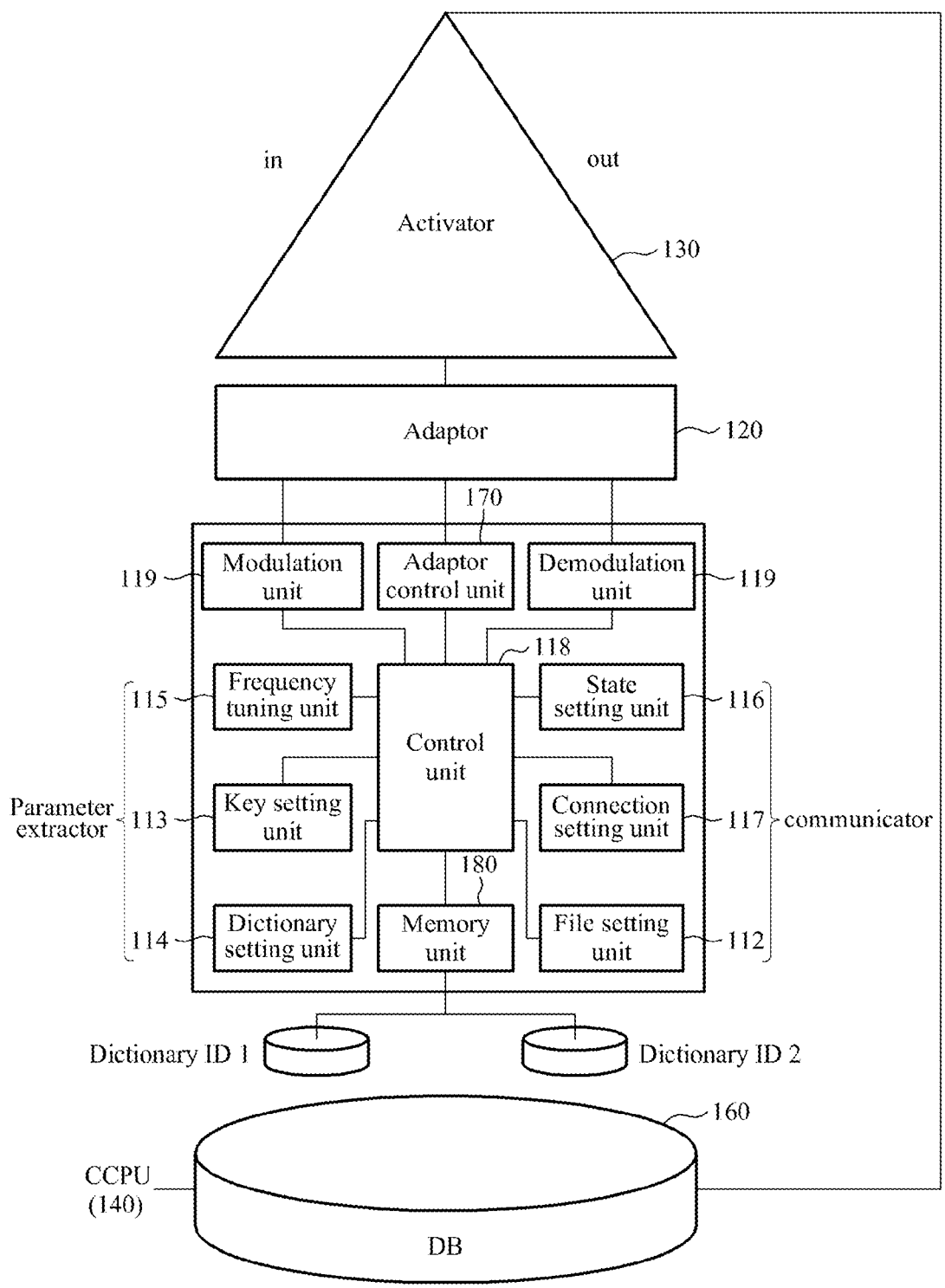
FIG. 1 is a block diagram illustrating a system for providing universal communication according to an exemplary embodiment.

Reference will now be made in detail to exemplary embodiments of the present invention, examples of which are illustrated in the accompanying drawings.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein. Like reference numerals refer to the like elements throughout.

The term "universal communication signal" used herein may include a signal of a morphological feature and a coded signal. The term "morphological feature" used herein may include a frequency component, for example, light, an electromagnetic wave, a language, and a vibration. The universal communication signal is not limited to a specific type of signal, and may include any form of representation of the frequency component. For example, the universal communication signal may be converted into a neurosensory signal including a brain wave.

The universal communication signal may include a binary coded signal of a computer-readable machine language.

The term "dictionary database" used herein may include dictionary information and may be constructed and evolved from at least one piece of data among at least one axiomatic definition data of a frequency component, at least one combinatory or derivative etymologic affinity data of the axiomatic definition data, and at least one syntagma data of the axiomatic definition data.

FIG. 1 is a block diagram illustrating a system 100 for providing universal communication according to an exemplary embodiment.

Referring to FIG. 1, the system 100 may include at least one dictionary database including dictionary information based on a frequency component, and may generate and evolve the at least one dictionary database, may generate, in response to an input signal of a first morphological feature, a universal communication signal of a second morphological feature based on setting information using the at least one dictionary database, and may convert the generated universal communication signal into an action signal.

The system 100 may include at least one dictionary database including dictionary information based on a frequency component, and may generate and evolve the at least one dictionary database, may generate a universal communication signal of a morphological feature include one frequency component selected from light, an electromagnetic wave, a language, and a vibration, using the at least one dictionary database, based on setting information selected and inputted by a user or setting information stored in the system 100 that may be edited, and may integrate the generated universal communication signal into an action signal.

The action signal may correspond to a result of conversion from the universal communication signal through an applicator based on various types of output. The action signal may include the frequency component represented in any form. For example, the action signal may correspond to a neurosensory signal including a brain wave.

The action signal may include a binary coded signal of a machine language.

The system 100 may receive an input signal of a first morphological feature, and may generate, in response to the received input signal, a universal communication signal of a second morphological feature based on setting information using at least one dictionary database. The system 100 may generate a universal communication signal of a morphological feature including one frequency component selected from light, a sound, an electromagnetic wave, a language, and a vibration, based on setting information selected and inputted by a user or setting information stored in the system 100 that may be edited.

Each of the first morphological feature and the second morphological feature may include one frequency component selected from light, a sound, an electromagnetic wave, a language, and a vibration, and the system 100 may generate the universal communication signal of the second morphological feature including a second frequency component based on the setting information by referring to the dictionary information for a first frequency component of the first morphological feature.

The first morphological feature may include one frequency component selected from light, a sound, an electromagnetic wave, a language, and a vibration, the second morphological feature may include a machine language-based binary code component, and the system 100 may generate the universal communication signal of a binary code component based on the setting information by referring to the dictionary information for a first frequency component of the first morphological feature.

For example, the system 100 may receive, from a first user, an input signal of a first morphological feature including a frequency component for communication, and may generate a universal communication signal of a second morphological feature including one frequency component selected from light, a sound, an electromagnetic wave, a language, and a vibration, based on setting information for the frequency component of the second morphological feature using at least one dictionary database that may store and maintain dictionary information including a symbolic meaning assigned to the frequency component.

Also, the system 100 may convert the generated universal communication signal into a universal language for communication with a second user based on the setting information for the frequency component, and may transmit the universal language to the second user.

The system 100 may convert the generated universal communication signal into an action signal for communication with a second user based on the setting information of the frequency component, and may transmit the action signal to the second user. The action signal may include a neurosensory signal for stimulating a sensory neuron of the second user responsible for a human experience, corresponding to the universal communication signal of the first user.

The action signal may include a binary coded signal of a machine language.

Each of the first user and the second user may include a human and a non-human entity.

For example, the system 100 may enable communication between a human and a non-human entity, for example, an animal, a plant, and the like, by sensing an experience-driven or emotion-driven signal from the human and the non-human entity, by generating a universal communication signal including a frequency component through referring to and analyzing dictionary information based on a frequency component of the sensed signal, and by converting the generated universal communication signal into an action signal.

The setting information may include parameter extraction information for setting a parameter for controlling the generation of the universal communication signal, or for extracting a parameter for controlling the generation of the universal communication signal from predetermined setting information and for controlling the extracted parameter, and communication setting information for setting a connection with at least one user and for controlling the conversion of the universal communication signal into the action signal.

The parameter extraction information may include tuning information for setting the second morphological feature, key setting information for setting the frequency component of the universal communication signal, and dictionary setting information for identifying and controlling the at least one dictionary database.

The communication setting information may include setting identification information for editing or controlling the predetermined setting information, connection setting information for controlling the connection with the system, and state setting information for controlling the conversion of the universal communication signal into the action signal.

The key setting information may include spectrum setting information for setting the second frequency component for the generation of the universal communication signal, modulation setting information for setting frequency modulation for a sine wave and an envelope in each frequency frame of the universal communication signal, mode information for setting a modulation mode of the universal communication signal, and consortium setting information for setting frequency synthesis in the frequency frame of the universal communication signal.

The modulation setting information may include time information of the sine wave and the envelope, frequency information, and texture information of the envelope, for each frequency frame.

The dictionary setting information may include information among definition information for setting axiomatic definition data associated with a symbolic meaning of the frequency component of the universal communication signal, affinity information for setting etymologic affinity data of the axiomatic definition data, meaning information for setting a meaning of the axiomatic definition data, and order setting information for setting syntagma data of the axiomatic definition data.

The tuning information may include selection information of at least one morphological feature, for example, the second morphological feature, range information of the universal communication signal, and synchronization information for setting synchronization between the universal communication signal and the action signal.

The system 100 for providing universal communication may include an applicator 110, an adaptor 120, and an activator 130.

The applicator 110 may generate a universal communication signal of a morphological feature including one frequency component selected from light, a sound, an electromagnetic wave, a language, and a vibration, using at least one dictionary database, based on setting information selected and inputted by a user or setting information stored in the system 100 that may be edited.

The activator 130 may sense an input signal, may transmit the sensed input signal to the applicator 110, and may output the action signal corresponding to the generated universal communication signal. The activator 130 may include an input module to sense the input signal, and an output module to output the action signal corresponding to the generated universal communication signal.

The adaptor 120 may convert the generated universal communication signal into a signal format corresponding to the action signal.

The applicator 110 may include a parameter extractor to set a parameter for controlling the generation of the universal communication signal, or to extract a parameter for controlling the generation of the universal communication signal from the predetermined setting information and to control the extracted parameter, and a communicator to set a connection with at least one user and to control the conversion of the universal communication signal into the action signal.

The parameter extractor may include a key setting unit 113, a dictionary setting unit 114, and a tuning unit 115, and the communicator may include a file setting unit 112, a state setting unit 116, and a connection setting unit 117.

Although not shown in FIG. 1, the applicator 110 may further include a language setting unit. The generation of the universal communication signal through the parameter extractor and the communicator of the applicator 110 is described in further detail with reference to FIG. 2.

Figure 2:
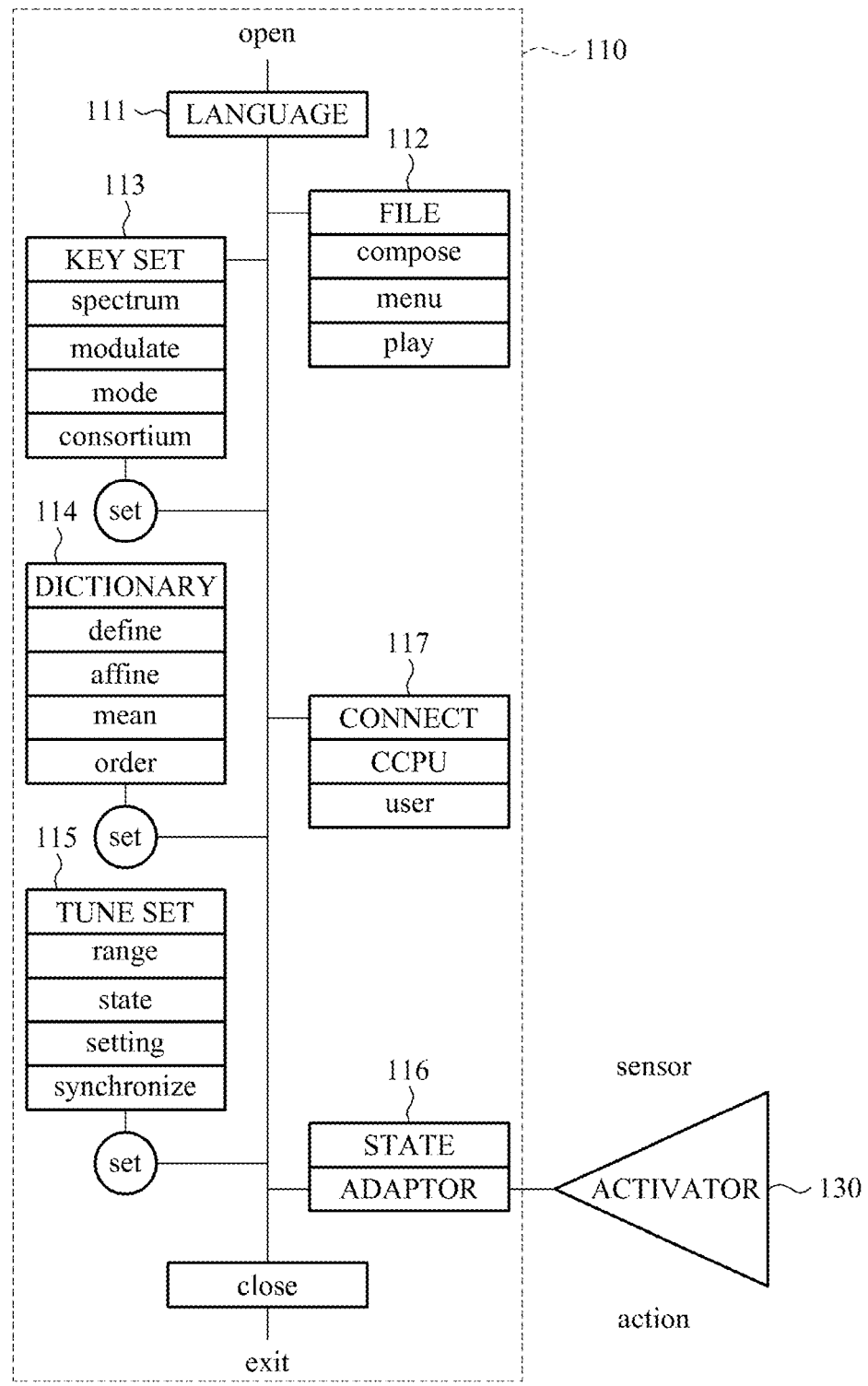
FIG. 2 is a diagram illustrating generation of a universal communication signal through the system of FIG. 1.

FIG. 2 is a diagram illustrating the generation of the universal communication signal through the system 100 of FIG. 1.

The applicator 110 may generate a universal communication signal of a morphological feature including one frequency component selected from light, a sound, an electromagnetic wave, a language, and a vibration, based on setting information for the frequency component selected and inputted by a user or setting information for the frequency component stored in the system 100 that may be edited, using at least one dictionary database that may store and maintain dictionary information including a symbolic meaning assigned to the frequency component.

The activator 130 may sense an input signal, may transmit the sensed input signal to the applicator 110, and may output the action signal corresponding to the generated universal communication signal.

The action signal may include a binary coded signal of a machine language.

Referring to FIGS. 1 and 2, the applicator 110 may include a parameter extractor to set a parameter for controlling the generation of the universal communication signal, or to extract a parameter for controlling the generation of the universal communication signal from predetermined setting information and to control the extracted parameter, and a communicator to set a connection with at least one user and to control the conversion of the universal communication signal into the action signal.

The parameter extractor may include a key setting unit 113, a dictionary setting unit 114, and a tuning unit 115, and the communicator may include a file setting unit 112, a state setting unit 116, and a connection setting unit 117.

The applicator 110 may further include a language setting unit 111 to receive, from a user, selection input information associated with a desired type of language for the universal communication signal.

The file setting unit 112 may generate setting information, and may edit and control the generated setting information. The file setting unit 112 may generate or edit setting identification information for editing and controlling stored setting information.

The key setting unit 113 may set and control the frequency component of the universal communication signal. The key setting unit 113 may set a spectrum of the frequency component of the universal communication signal generated by the applicator 110, may set frequency modulation for a sine wave and an envelope in each frequency frame of the universal communication signal, may set a modulation mode of the universal communication signal, and may set frequency synthesis in the frequency frame of the universal communication signal.

The key setting unit 113 may set the frequency component of the universal communication signal based on time information of the sine wave and the envelope, frequency information, and texture information of the envelope, for each frequency frame.

The dictionary setting unit 114 may select at least one dictionary database for the generation of the universal communication signal, and may control the at least one dictionary database being selected.

The dictionary setting unit 114 may set axiomatic definition data associated with a symbolic meaning of the frequency component of the universal communication signal, may set etymologic affinity data of the axiomatic definition data, may set a meaning of the axiomatic definition data, and may set syntagma data of the axiomatic definition data.

The tuning unit 115 may set one morphological feature among light, a sound, an electromagnetic wave, a language, and a vibration. The tuning unit 115 may select at least one morphological feature, may set a range of the universal communication signal, and may set synchronization information between the universal communication signal and the action signal.

The parameter extractor may extract a parameter including key setting information, tuning information, and dictionary setting information from predetermined setting information or shared setting information through a central communication processing unit (CCPU) 140 of FIG. 1 automatically, may match the automatically extracted parameter to the key setting unit 113, the dictionary setting unit 114, and the tuning unit 115, and may control the key setting unit 113, the dictionary setting unit 114, and the tuning unit 115 to reset the parameter for controlling the generation of the universal communication signal to be the matched parameter.

The state setting unit 116 may control the conversion of the universal communication signal generated by the applicator 110 into the action signal.

The connection setting unit 117 may set a connection with at least one system for providing universal communication. The connection setting unit 117 may control a connection of at least one user of the system 100 to the CCPU 140 over a communication network, and may control a communication between the at least one user.

Referring to FIG. 1 again, the system 100 may further include the CCPU 140 to provide at least one user with a dictionary database list for downloading the at least one dictionary database, and to update the at least one dictionary database using user-created dictionary data received from the at least one user.

The CCPU 140 may control a connection of the at least one user to the system 100 over the communication network, and may control a communication between the at least one user connected to the system 100. For example, a first user may access the system 100 through the CCPU 140 to share dictionary information created by a second user, setting information, and a stored universal communication signal, consequently contents related with the information.

The communication network may include a wired communication network and a wireless communication network, and the wireless communication network may include a network device, for example, a base station controller, a base transceiver station, and/or a relay station.

The applicator 110 may further include a modulation/demodulation module 119 to modulate the universal communication signal of the second morphological feature, and to demodulate the sensed input signal, based on the setting information.

According to other embodiments, the system 100 may include at least one adaptor 120 and at least one activator 130, and the applicator 110 may further include an adaptor control unit 170 to control an ON/OF status of the at least one adaptor 120 or to control power supply to the at least one adaptor 120.

The applicator 110 may further include a memory unit 180 to store at least one piece of data among the generated or extracted parameter, the setting information, the dictionary database or dictionary information downloaded through the CCPU 140, and the generated universal communication signal, for a short time.

Figure 3A:
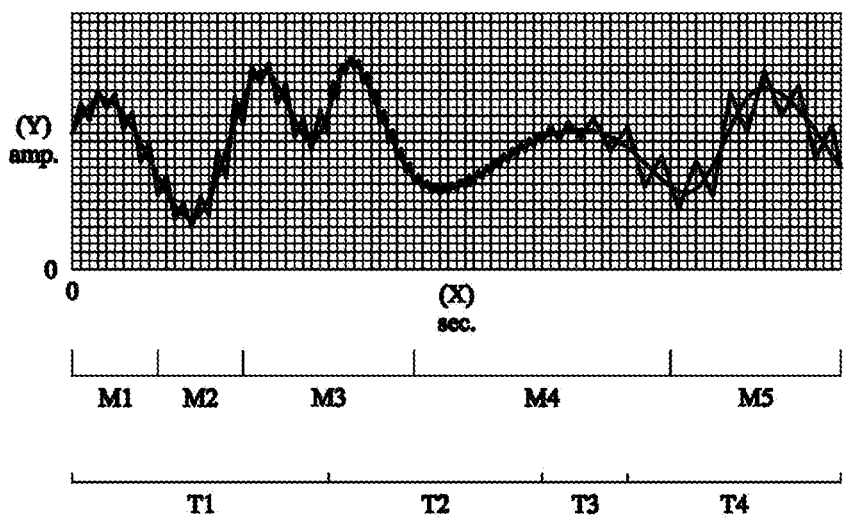
FIGS. 3A and 3B are graphs illustrating a universal communication signal generated through a system for providing universal communication according to an exemplary embodiment.
Figure 3B:
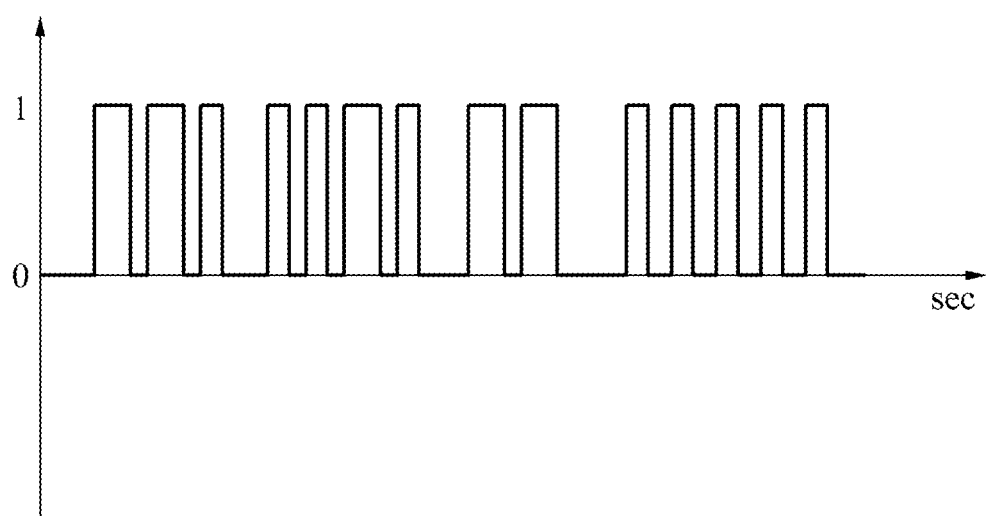

FIGS. 3A and 3B are graphs illustrating the universal communication signal generated through the system 100 of FIG. 1.

The applicator 110 of the system 100 may generate a universal communication signal based on setting information for a frequency component. The applicator 110 may generate the universal communication signal based on key setting information for setting the frequency component of the morphological feature of the universal communication signal, tuning information for setting one morphological feature, dictionary setting information for identifying and controlling at least one dictionary database, and state setting information for controlling the conversion of the universal communication signal into the action signal.

The applicator 110 may set a spectrum of the frequency component of the generated universal communication signal, may set frequency modulation for a sine wave and an envelope in each frequency frame of the universal communication signal, may set a modulation mode of the universal communication signal, and may set frequency synthesis in the frequency frame of the universal communication signal.

Referring to FIG. 3A, the universal communication signal generated through the applicator 110 may be divided into a predetermined number of frequency frames M1 through M5 based on setting information selected and inputted by a user or setting information stored in the system 100 that may be edited. The frequency frames M1 through M5 may have different time intervals or a uniform time interval.

The generated universal communication signal may include time information of a sine wave and an envelope, frequency information, and volume information of the sine wave or the envelope, for each frequency frame, based on modulation setting information. The volume information may be set for each frequency frame, or may be set in an overlapping manner in a plurality of frequency frames. The volume information may include texture information of the envelope.

The texture information T1 through T4 may refer to microfrequency information that may be overlaid onto and synthesized with the sine wave. The texture information may be used to represent axiomatic definition data, etymologic affinity data, and syntagma data. The texture information may correspond to additional information that may be set for each frequency frame, or may be set in an overlapping manner in a plurality of frequency frames.

The universal communication signal may include a feature vector for each frequency frame of the frequency component. The universal communication signal may be divided into a predetermined number of frequency frames, and each frequency frame may include a feature vector.

As an example, when the universal communication signal has a morphological feature of a voice signal, the applicator 110 may divide the received voice signal into frequency frames by word or phoneme, or at different time intervals as shown in FIG. 3A, and may set information associated with axiomatic definition data, etymologic affinity data, and syntagma data to a feature vector for each frequency frame.

As another example, when the feature vector corresponds to a 3-axis vector, the feature vector may include time information in a first axis, frequency information in a second axis, and volume information in a third axis. The volume information may correspond to texture information used to represent axiomatic definition data, etymologic affinity data, and syntagma data.

The system may generate a binary coded universal communication signal of a first morphological feature including one first frequency component selected from light, a sound, an electromagnetic wave, a language, and a vibration, based on setting information, by referring to dictionary information for the first frequency component.

The dictionary information may include axiomatic definition data for representing a frequency component of a predetermined region in a combination of "0" and "1", etymologic affinity data of the axiomatic definition data, and syntagma data of the axiomatic definition data.

Referring to FIG. 3B, the system 100 may generate the universal communication signal in binary "0" and "1" based on the setting information.

Figure 4:
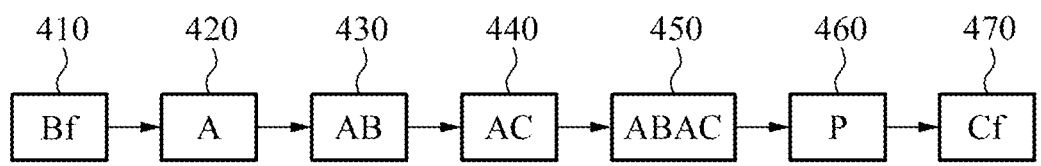
FIG. 4 is a diagram illustrating construction and evolution of a dictionary database through a system for providing universal communication according to an exemplary embodiment.

FIG. 4 is a diagram illustrating construction and evolution of the dictionary database through the system.

The term "translation process" as used herein may refer to a process of deriving intermediate dictionary data through conducting an analysis of a likelihood of resulting second dictionary data to first dictionary data based on the entire dictionary information included in at least one dictionary database, and extracting and parameterizing an axiom or affinity between the first dictionary data and the second dictionary data by referring to the intermediate dictionary data.

The system may produce first dictionary translation data AB 430 using first dictionary data Bf 410 based on the entire dictionary information A 420 included in at least one dictionary database. The entire dictionary information A 420 may include the first dictionary data Bf 410 and at least one reference data C, D, E, [ . . . ]. The first dictionary translation data AB 430 may correspond to a translation version of the first dictionary data Bf 410 through analysis of axiomatic definition data, etymologic affinity data, and syntagma data from the entire dictionary information A 420. The etymologic affinity data may include derivation information and usage information of the axiomatic definition data.

Also, the system may produce second dictionary translation data AC 440 using the reference data C based on the entire dictionary information A 420 included in at least one dictionary database. The second dictionary translation data AC 440 may correspond to a translation version of the reference data C through analysis of axiomatic definition data, etymologic affinity data, and syntagma data from the entire dictionary information A 420.

The system may produce intermediate dictionary data ABAC 450 by computing a likelihood of the second dictionary translation data AC 440 to the first dictionary translation data AB 430, may extract and parameterize an axiom or affinity between the first dictionary data Bf 410 and the reference data C based on the intermediate dictionary data ABAC 450, and may evolve the first dictionary data Bf 410 to second dictionary data Cf 470 to construct and evolve the at least one dictionary database.

Figure 5:
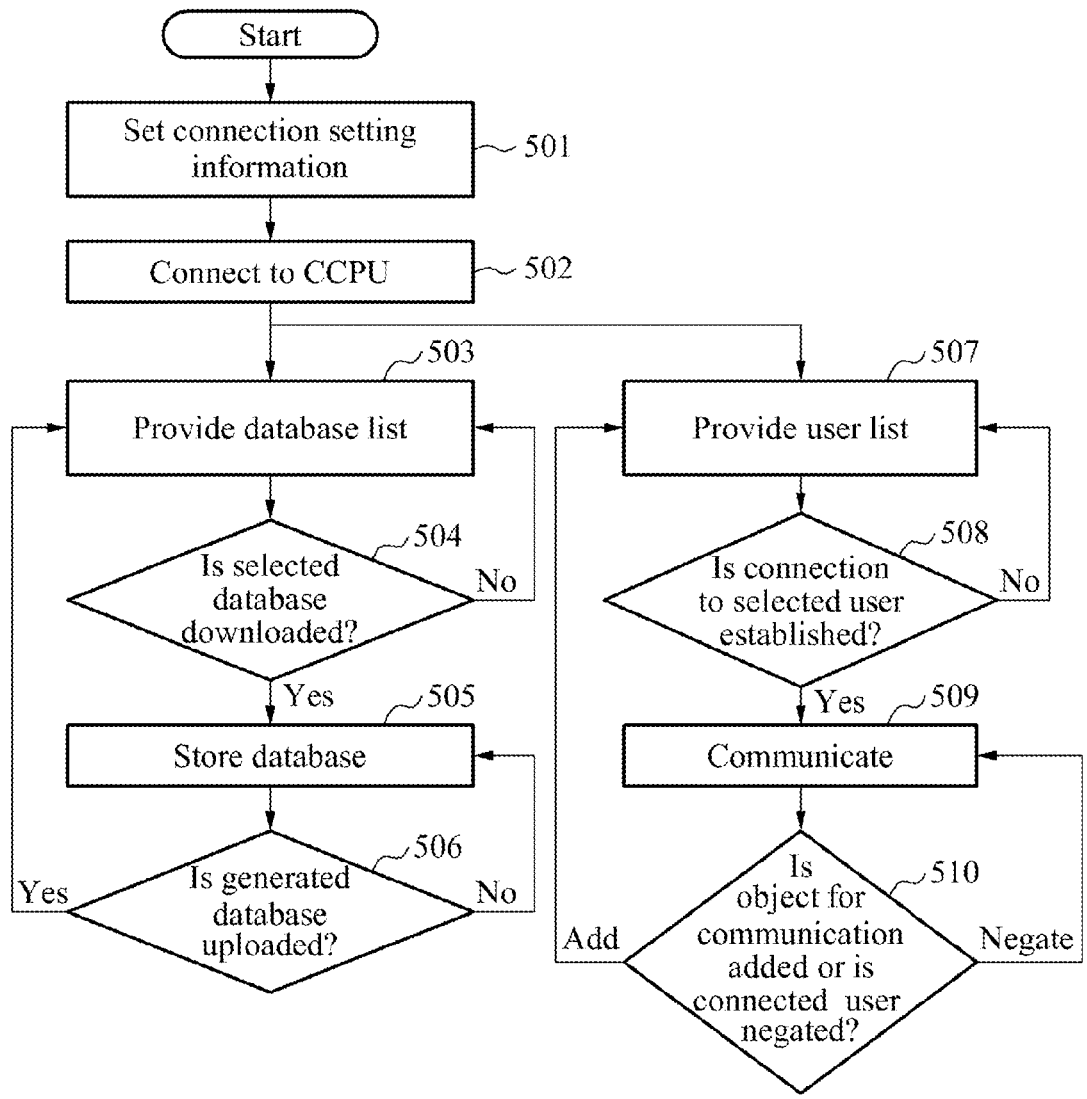
FIG. 5 is a flowchart illustrating use of a dictionary database and control of access for communication between users through a central communication processing unit (CCPU) of a system for providing universal communication according to an exemplary embodiment.

FIG. 5 is a flowchart illustrating the use of the dictionary database and the control of access for communication between users through the CCPU 140 of the system 100 of FIG. 1.

Referring to FIG. 5, at least one user may set connection setting information through the connection setting unit 117 of the applicator 110 in operation 501, and may connect to the CCPU 140 in operation 502.

In operation 503, the CCPU 140 may provide the at least one user with a dictionary database list for downloading at least one dictionary database.

In operation 504, the CCPU 140 may receive a selection input of a predetermined dictionary database among the dictionary database list from the user, and determine whether the selected dictionary database is downloaded.

When the download of the selected dictionary database is determined to be successful in operation 504, the CCPU 140 may store the selected dictionary database in a storage unit 160 of FIG. 1, and the system 100 may generate a universal communication signal based on dictionary information of the stored dictionary database in operation 505.

When the download of the selected dictionary database is determined to be unsuccessful in operation 504, the process may revert to operation 503 to allow the CCPU 140 to provide the at least one user with the dictionary database list for downloading the at least one dictionary database continuously.

In operation 506, the CCPU 140 may determine whether a constructed or evolved dictionary database is present in the system 100 and whether to upload user-created dictionary data to the constructed or evolved dictionary database.

When a selection input for uploading the user-created dictionary data is received from the user in operation 506, the process may revert to operation 503 to allow the CCPU 140 to update the dictionary database list by adding the user-created dictionary data and to provide the updated dictionary database list continuously.

When receiving a selection input for uploading the user-created dictionary data from the user fails in operation 506, the CCPU 140 may store the user-created dictionary data in the storage unit 160 of the system 100.

When the at least one user sets connection setting information through the connection setting unit 117 of the applicator 110 in operation 501, and connects to the CCPU 140 in operation 502, the CCPU 140 may also provide a list of the at least one user to the system 100 in operation 507.

In operation 508, the CCPU 140 may receive a user selection input for a predetermined user among the list of the at least one user being connected, and determine whether a connection with the selected user is completed.

When the connection with the selected user is determined to be successful in operation 508, the CCPU 140 may establish a communication between the at least one user in operation 509.

When the connection with the selected user is determined to be unsuccessful in operation 508, the process may revert to operation 507 to the CCPU 140 to provide the list of the at least one user being connected continuously.

In operation 510, the CCPU 140 may determine whether to add a user for communication or to negate the at least one user conducting the communication. When an additional user for communication is determined, the process may revert to operation 507 to allow the CCPU 140 to provide the list of the at least one user continuously. When negation of the user is determined, the process may revert to operation 509 to allow the CCPU 140 to negate the at least one user conducting the communication.

As described in the foregoing, the use of the dictionary database and the control of access for communication between users may be performed through the CCPU 140, and may be implemented in a form of software, an agent, an application, a messenger, for example, an AOL messenger and an MSN messenger, and the like, that may be controlled by the CCPU 140.

Figure 6:
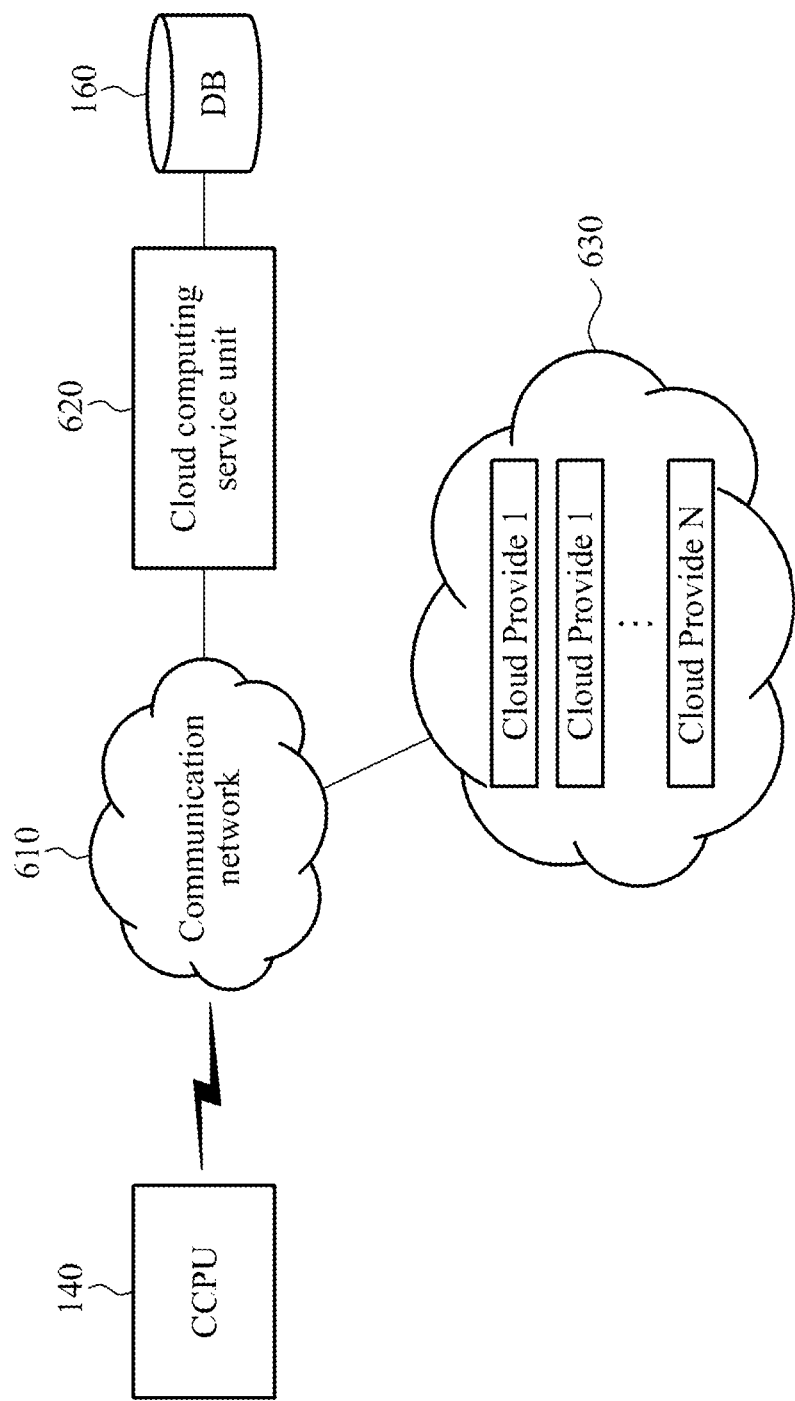
FIG. 6 is a diagram illustrating a system for providing universal communication using cloud computing according to an exemplary embodiment.

FIG. 6 is a diagram illustrating the system for providing universal communication using cloud computing according to an exemplary embodiment.

Referring to FIG. 6, the system may further include a cloud computing service unit 620. The CCPU 140 of the system may access the cloud computing service unit 620 over a communication network 610.

The cloud computing service unit 620 may store and manage computing resources of at least one dictionary database, user-created dictionary data, and intangible contents and software. The cloud computing service unit 620 may provide the CCPU 140 with a dictionary database, setting information, a generated universal communication signal, user-created dictionary data, and intangible contents and software, in response to a request from the CCPU 140, and may receive, from the system, user-created dictionary data, generated or evolved dictionary data, setting information, and stored data, and may store and manage the received data in the storage unit 160.

The storage unit 160 may store at least one piece of data among a user identification (ID), a file ID for identifying setting information, a key ID for identifying key setting information, a dictionary ID for identifying at least one dictionary database or location information of the at least one dictionary database, tune ID for identifying tuning information, and a generated universal communication signal.

When a request for generation of a universal communication signal is received from the CCPU 140, the cloud computing service unit 620 may operate the applicator 110 to generate the universal communication signal, may process the request from the CCPU 140 associated with the generation of the universal communication signal, and may store and manage the processing result.

The cloud computing service unit 620 may connect to a cloud provider 630 over the communication network 610 using a virtual organization technique, and may register a resource of the applicator 110 provided by the cloud provider 630. The cloud computing service unit 620 may provide an application programming interface (API) to allow a user to develop or apply the applicator 110 through the API.

The communication network 610 may include a wired communication network and a wireless communication network, and the wireless communication network may include a network device, for example, a base station controller, a base transceiver station, and/or a relay station.

Figure 7:
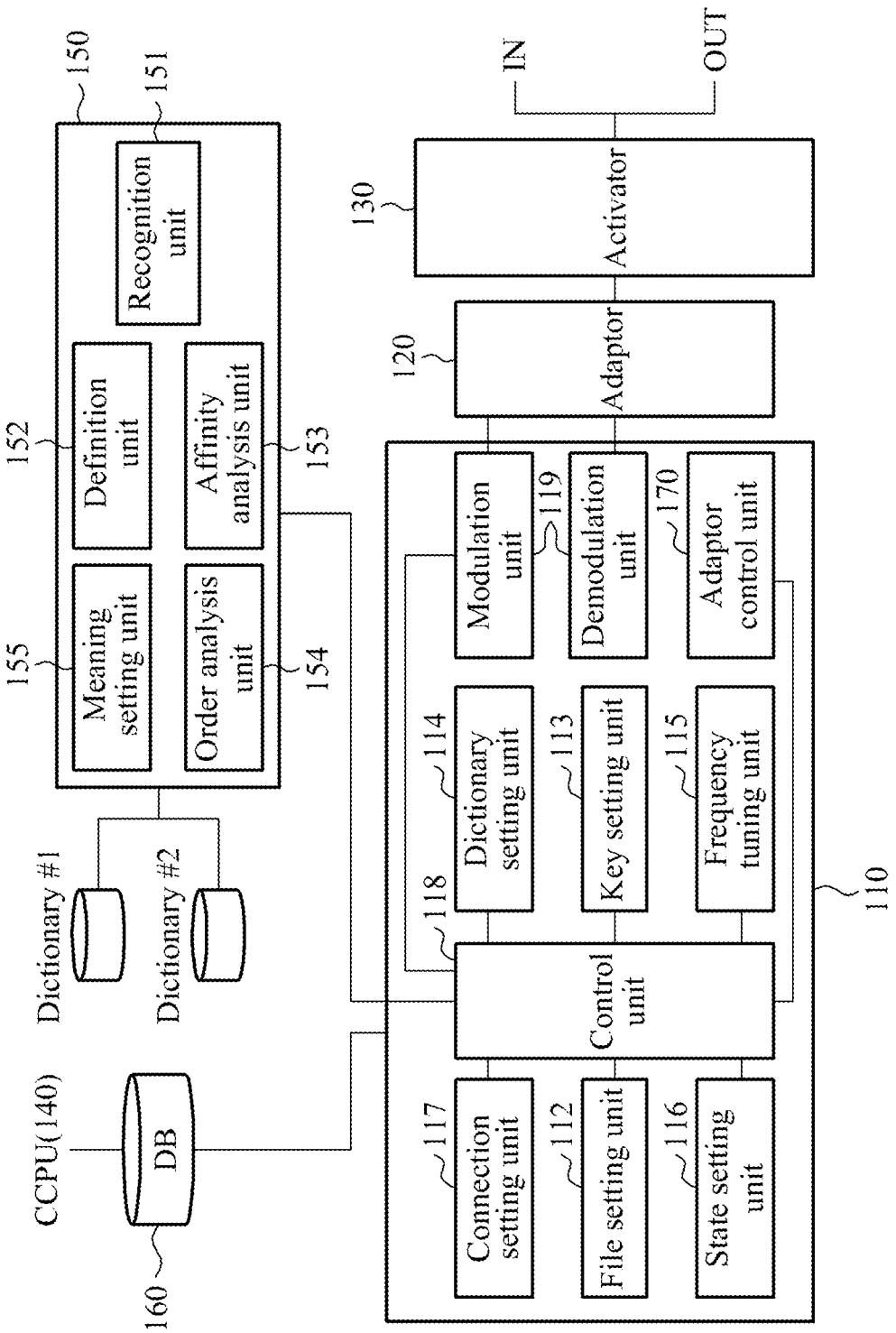
FIG. 7 is a block diagram illustrating a system for providing universal communication according to another exemplary embodiment.

FIG. 7 is a block diagram illustrating a system for providing universal communication according to another exemplary embodiment.

The system may include a universal communication provider including the applicator 110, the adaptor 120, and the activator 130, and a dictionary evolution module 150. The applicator 110, the adaptor 120, and the activator 130 are identical to those of FIG. 1, and thus, repeated descriptions are omitted herein for conciseness.

The applicator 110 may include the file setting unit 112, the key setting unit 113, the dictionary setting unit 114, the tuning unit 115, the state setting unit 116, the connection setting unit 117, and the control unit 118. Although not shown in FIG. 7, the applicator 110 may further include a language setting unit. The applicator 110 including the language setting unit is identical to that of FIG. 2, and thus, a repeated description is omitted herein for conciseness.

The system may further include the CCPU 140 to provide at least one user with a dictionary database list for downloading at least one dictionary database, for example, Dictionary #1 and Dictionary #2, and to update the at least one dictionary database using user-created dictionary data received from the at least one user.

The CCPU 140 may control a connection of the at least one user to the system over a communication network, and may control a communication between the at least one user connected to the system.

The CCPU 140 of FIG. 7 is identical to that of FIGS. 5 and 6, and thus, a repeated description of the CCPU 140 is omitted herein for conciseness.

According to other embodiments, the system may include at least one adaptor 120 and at least one activator 130, and the applicator 110 may further include an adaptor control unit 170 to control an ON/OF status of the at least one adaptor 120 or to control power supply to the at least one adaptor 120.

The adaptor control unit 170 may correspond to a stand-alone device independent of the applicator 110.

The dictionary evolution module 150 may construct and evolve the at least one dictionary database including at least one axiomatic definition data being set based on a frequency component, at least one combinatory etymologic affinity data of the axiomatic definition data, and at least one syntagma data of the axiomatic definition data.

The dictionary evolution module 150 may compute a likelihood of second dictionary translation data to first dictionary translation data. Here, the first dictionary translation data and the second dictionary translation data may be produced by performing a translation process on first dictionary data and second dictionary data, respectively, based on dictionary information of the at least one dictionary database. Further, the dictionary evolution module 150 may extract an axiom or affinity between the first dictionary data and the second dictionary data based on the computed likelihood, and evolve the first dictionary data to the second dictionary data to construct and evolve the at least one dictionary database.

As described in the foregoing, the dictionary evolution module 150 may produce first dictionary translation data using first dictionary data based on the entire dictionary information included in at least one dictionary database. Also, the dictionary evolution module 150 may produce second dictionary translation data using reference data based on the entire dictionary information included in at least one dictionary database.

The dictionary evolution module 150 may produce intermediate dictionary data by computing a likelihood of the second dictionary translation data to the first dictionary translation data, may extract and parameterize an axiom or affinity between the first dictionary data and the reference data based on the intermediate dictionary data, and evolve the first dictionary data to second dictionary data to evolve the at least one dictionary database.

The dictionary evolution module 150 may include a recognition unit 151 to extract and recognize a frequency component of a dictionary data signal, a definition unit 152 to set axiomatic definition data of the extracted frequency component, an affinity analysis unit 153 to analyze etymologic affinity data of the axiomatic definition data, a meaning setting unit 155 to set a meaning of the axiomatic definition data, and an order analysis unit 154 to analyze syntagma data of the axiomatic definition data.

The system may further include the storage unit 160 to store at least one piece of information among a user ID of at least one user, location information or dictionary ID of the at least one dictionary database, the dictionary information, and the generated universal communication signal.

According to other embodiments, although not shown in FIG. 7, the system may further include the same cloud computing service unit as the cloud computing service unit 620 of FIG. 6. The CCPU 140 of the system may access the cloud computing service unit over a communication network.

Figure 8:
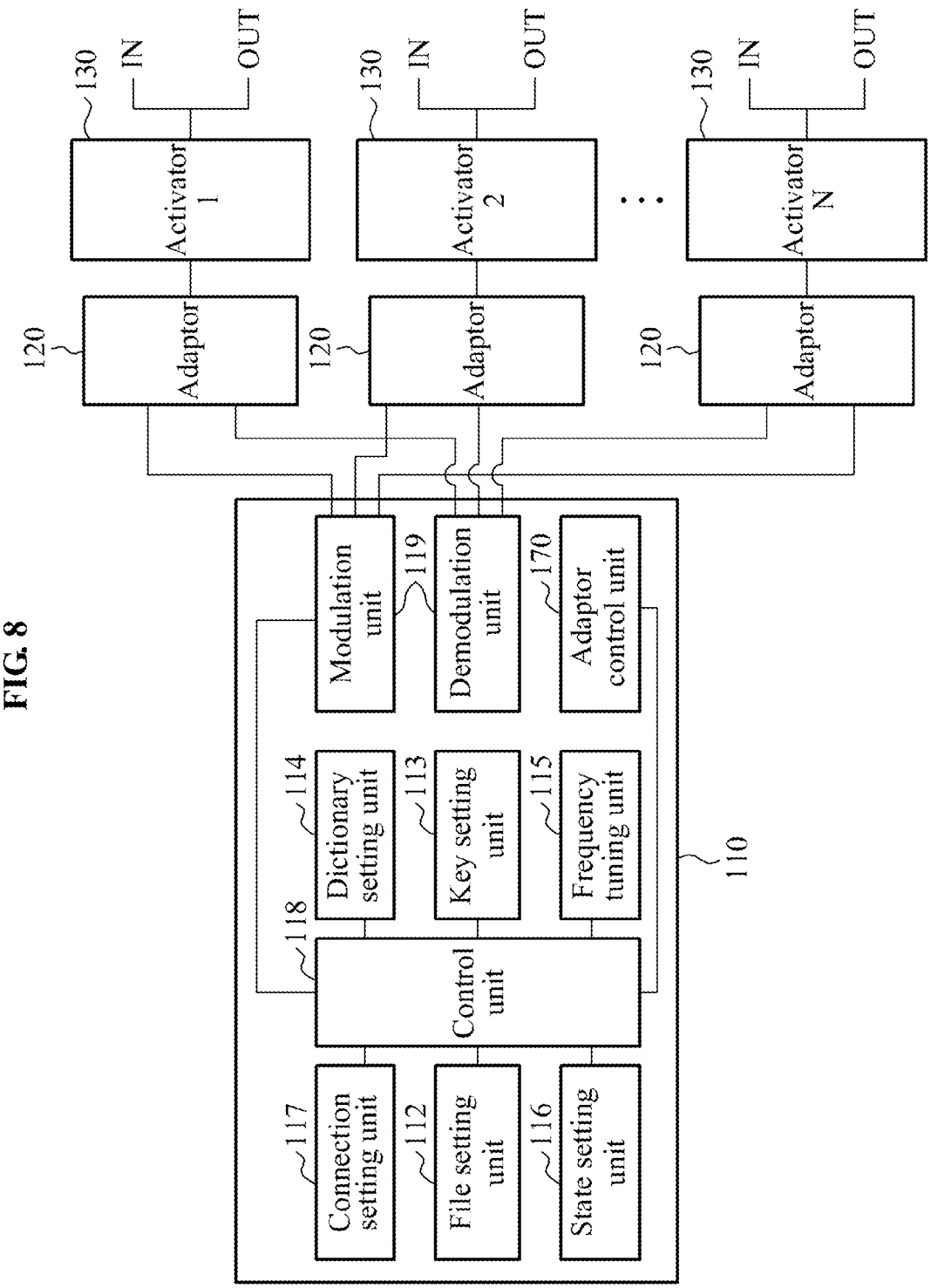
FIG. 8 is a block diagram illustrating a system for providing universal communication according to still another exemplary embodiment.

FIG. 8 is a block diagram illustrating a system for providing universal communication according to still another exemplary embodiment of the present invention.

The system may include the universal communication provider including the applicator 110, the adaptor 120, and the activator 130, and the dictionary evolution module 150. The applicator 110 is identical to that of FIGS. 1 and 2, and thus, disclosure repeated description is omitted herein for conciseness.

The system may include at least one adaptor 120 and at least one activator 130, for example, Activator 1 through Activator N. The at least one activator 130 may be attachable to and detachable from at least one object, and the at least one adaptor 120 may convert the generated universal communication signal into a data format corresponding to the action signal and may transmit the action signal for each of the at least one activator 130.

The at least one activator 130 may convert universal communication signals of different morphological features as at least one action signal corresponding to the universal communication signals. The at least one activator 130 may receive, from the applicator 110, the at least one action signal converted from the universal communication signals of different morphological features through the at least one adaptor 120, and output the at least one action signal through various objects.

The applicator 110 may include at least one connector compatible with the at least one adaptor 120.

The at least one activator 130 may correspond to at least one device, for example, at least one stand-alone device, and may be attachable to and detachable from at least one object. The at least one adaptor 120 may correspond to at least one device, for example, at least one stand-alone device, matching the at least one activator 130, respectively, and may integrate the generated universal communication signal into a data format corresponding to the action signal and may transmit the action signal.

According to other embodiments, the at least one activator 130 may be implemented as a transceiver. The at least one activator 130 may include at least one pair of activator, each pair including one activator implemented as a transceiver attachable to and detachable from an object and the other activator implemented as a transceiver. The activator implemented as a transceiver attachable to and detachable from an object may correspond to a stand-alone device.

The applicator 110 may further include an adaptor control unit 170 to control an ON/OF status of the at least one adaptor 120 and to control power supply to the at least one adaptor 120. The adaptor control unit 170 may correspond to a stand-alone device, independent of the applicator 110.

When the system includes the at least one activator 130, the system may control the activation of the at least one activator 130 selectively through the adaptor control unit 170 controlling the ON/OF status of the at least one adaptor 120 or controlling the power supply to the at least one adaptor 120. The activation of the at least one activator 130 may be controlled selectively by the adaptor control unit 170 controlling the ON/OF status of the at least one adaptor 120 or the power supply to the at least one adaptor 120 based on the setting information being set by the state setting unit 116 of the applicator 110.

The setting information may include ON/OFF information of an input and an output for each of at least one stand-alone device.

For example, when the system includes two adaptors 120, the applicator 110 may provide the user with states of the adaptors 120, represented by STATE 1 and STATE 2, and IDs of the adaptors 120. When the user sets a state of a first adaptor to STATE 1 to activate an input of the first adaptor and a state of a second adaptor to STATE 2 to activate an input and an output of the second adaptor through the applicator 110, the setting information may include information of Tables 1 and 2.

TABLE 1

| STATE 1 | | |
|---|---|---|
| ID | (in) | out |

TABLE 2

| STATE 2 | | |
|---|---|---|
| ID | (in) | (out) |

The system may control the activation of an input and an output of the at least one activator 130 based on the setting information of the applicator 110. When the system includes three activators 130, the activation of an input and an output may be controlled selectively through the applicator 110 for each activator 130.

Referring to Table 3, the system may activate an input of a first activator Activator ID #1 in a first state STATE 1. In a second state STATE 2, the system may activate an input of a first activator Activator ID #1 and an output of a second activator ID #2. In a third state STATE 3, the system may activate an input and an output of a first activator Activator ID #1 and an input and an output of a second activator Activator ID #2 and an output of a third activator Activator ID #3. In a fourth state STATE 4, the system may activate an input and an output of a first activator Activator ID #1.

TABLE 3

| STATE | Activator ID | INPUT | OUTPUT |
|---|---|---|---|
| STATE 1 | ID #1 | Y | N |
| | ID #2 | N | N |
| | ID #3 | N | N |
| STATE 2 | ID #1 | Y | N |
| | ID #2 | N | Y |
| | ID #3 | N | N |
| STATE 3 | ID #1 | Y | Y |
| | ID #2 | Y | Y |
| | ID #3 | N | Y |
| STATE 4 | ID #1 | Y | Y |
| | ID #2 | N | N |
| | ID #3 | N | N |

Figure 9:
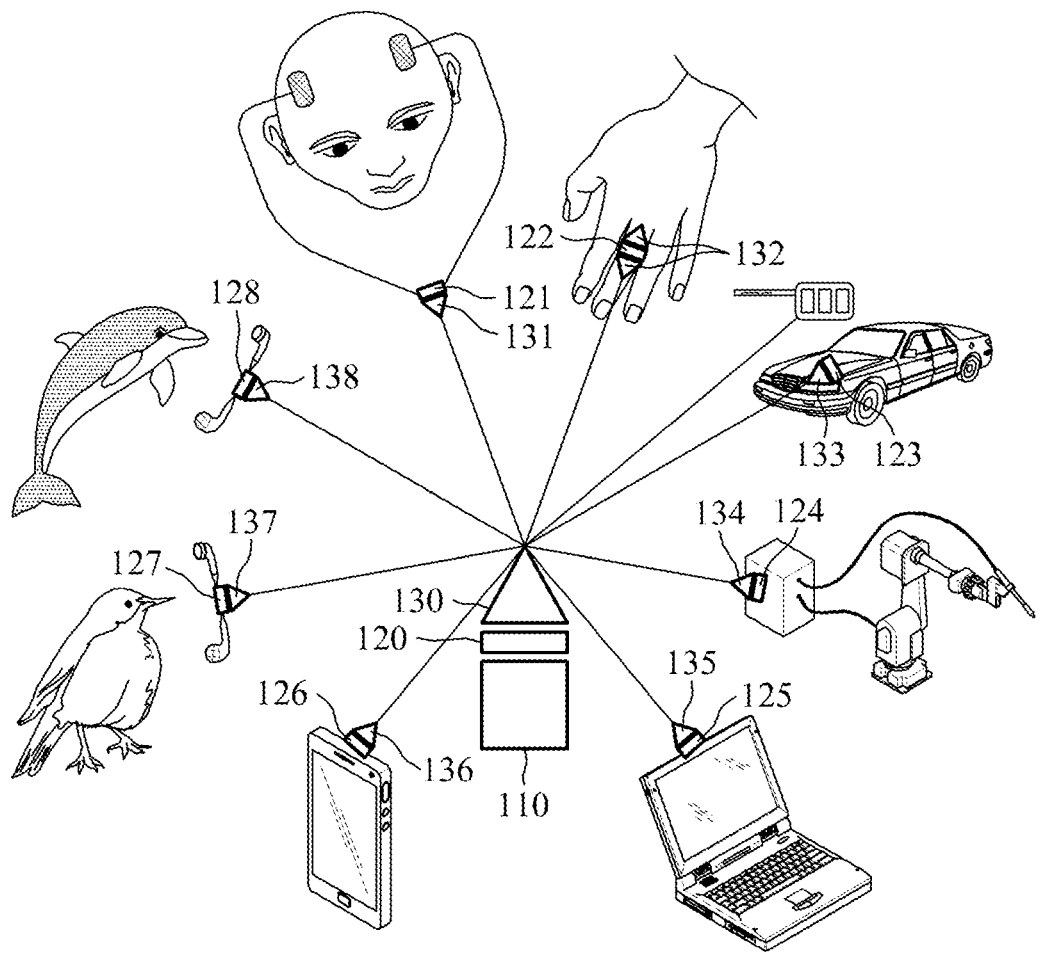
FIG. 9 is a diagram illustrating an example of implementation of a system for providing universal communication according to exemplary embodiments.

FIG. 9 is a diagram illustrating an example of implementation of the system for providing universal communication according to the exemplary embodiments.

The system may include the applicator 110 to generate and evolve at least one dictionary database including dictionary information based on a frequency component and to generate a universal communication signal of a morphological feature including one frequency component selected from light, a sound, an electromagnetic wave, a language, and a vibration, based on setting information using the at least one dictionary database, the first adaptor 120 to convert the generated universal communication signal into a data format corresponding to an action signal, and the first activator 130 to output the action signal corresponding to the generated universal communication signal.

The first adaptor 120 may convert the universal communication signal generated by the applicator 110 into the data format corresponding to the action signal based on the morphological feature of the universal communication signal.

The applicator 110 may receive an input signal of a first morphological feature, and may generate, in response to the received input signal, a universal communication signal of a second morphological feature based on setting information using the at least one dictionary database, and may generate a universal communication signal of a morphological feature including one frequency component selected from light, a sound, an electromagnetic wave, a language, and a vibration, based on setting information selected and inputted by a user or setting information stored that may be edited. According to the exemplary embodiments, the generated universal communication signal may be outputted as an action signal through the at least one adaptor 120 and the applicator 110.

The first activator 130 may be implemented as a transceiver to establish a communication with various objects through the action signal. The first activator 130 may be paired with second activators 131 through 138 to transmit and receive the action signal. The second activators 131 through 138 may be also implemented as a transceiver.

The system may include second adaptors 121 through 128 to convert into a linguistic signal for communication between the objects through the second activators 131 through 138.

The second activators 131 through 138 and the second adaptors 121 through 128 may be attachable to and detachable from the objects, however, the present invention is not limited to such a configuration.

In a case of communication between a human and a robot, a brain wave of the human may be converted into an action signal of a binary coded machine language based on setting information being set by a user, and may be outputted to the robot to represent the human experience or control the robot.

The system may receive an input signal from a first entity, may generate a universal communication signal based on setting information for a frequency component, may convert the generated universal communication signal into an action signal for communication with a second entity, and may transmit the action signal to the second entity.

In a case of communication between a human and a non-human entity, for example, a whale and a bird, the second activators 137 and 138 may receive an input signal of a first morphological feature from the non-human entity through the second adaptors 127 and 128, respectively, based on a frequency component of the input signal. The applicator 110 may generate a universal communication signal of a second morphological feature based on setting information for the frequency component using at least one dictionary database, the first adaptor 120 and the second adaptor 121 may convert the generated universal communication single into an action signal, and the first activator 130 and the second activator 131 implemented as transceivers may output the action signal in a form of a brain wave to the human, and vice versa.

The system may represent the human experience in various morphological features to enable communication between a human and a computer-controlled entity, for example, a personal computer (PC), a robot, and the like, and between a human and a communication medium, for example, a terminal such as a smart phone, a personal digital assistant (PDA), and the like.

The action signal generated through the applicator 110, the first adaptor 120, and the first activator 130 may be transmitted to a car through the second activator 133 and the second adaptor 123 to control driving and management of the car by controlling an electric control module of the car. The lock/unlock and startup of the car may be controlled by interworking with a key of the car.

The system may enable experience sharing between different sophisticated language users and between a human and a non-human entity, and may expand the experience of humans and a human and a non-human entity in various forms, for example, light, a sound, an electromagnetic wave, a language, and a vibration.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard discs, floppy discs, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

According to the exemplary embodiments, various human experiences may be represented in various forms, for example, light, a sound, an electromagnetic wave, a language, and a vibration, through various communication media, and accordingly, experiences of humans and between a human and a non-human entity, for example, an animal and a plant, may be shared through various types of representation.

According to the exemplary embodiments, a user may deliver a desired instruction to a computer-controlled entity, for example, a robot, through a universal communication signal of a binary coded machine language absent a special program, and consequently, may control the entity directly.

According to the exemplary embodiments, at least one dictionary database may be generated and evolved, the dictionary database including axiomatic definition data associated with an axiom for communication between a human and a non-human entity being set from an input signal, combinatory etymologic affinity data of the axiomatic definition data, and syntagma data of the axiomatic definition data.

According to the exemplary embodiments, communications between different language users and between a human and a non-human entity may be enabled through a universal communication signal.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A system for providing universal communication, the system comprising:
   a processor;
   a storage unit that stores at least one dictionary database including dictionary information based on a frequency component, and which is communicatively coupled to the processor,
   wherein the system generates and evolves the at least one dictionary database, generates, in response to an input signal of a first morphological feature, a universal communication signal of a second morphological feature based on setting information using the at least one dictionary database, and converts the generated universal communication signal into an action signal, wherein the system comprises:
   an applicator to generate the universal communication signal of the second morphological feature including one frequency component selected from light, a sound, an electromagnetic wave, a language, and a vibration, based on the setting information using the at least one dictionary database;
   an activator to sense the input signal, to transmit the sensed input signal to the applicator, and to output the action signal corresponding to the generated universal communication signal; and
   an adaptor to convert the generated universal communication signal into a signal format corresponding to the action signal.

2. The system of claim 1, wherein the first morphological feature and the second morphological feature include one frequency component selected from light, a sound, an electromagnetic wave, a language, and a vibration, and
   the system generates the universal communication signal of the second morphological feature including a second frequency component based on the setting information by referring to the dictionary information for a first frequency component of the first morphological feature.

3. The system of claim 1, wherein the first morphological feature includes one frequency component selected from light, a sound, an electromagnetic wave, a language, and a vibration,
   the second morphological feature includes a machine language-based binary code component, and
   the system generates the universal communication signal of the binary code component based on the setting information by referring to the dictionary information for a first frequency component of the first morphological feature.

4. The system of claim 2, wherein the setting information comprises parameter extraction information for setting a parameter for controlling the generation of the universal communication signal or for extracting a parameter for controlling the generation of the universal communication signal from predetermined setting information, and for controlling the extracted parameter, and communication setting information for setting a connection with at least one user and for controlling the conversion into the action signal.

5. The system of claim 4, wherein the parameter extraction information comprises tuning information for setting the second morphological feature, key setting information for setting the frequency component of the universal communication signal, and dictionary setting information for identifying and controlling the at least one dictionary database, and
   the communication setting information comprises setting identification information for editing and controlling the predetermined setting information, connection setting information for controlling the connection with the system, and state setting information for controlling the conversion of the universal communication signal into the action signal.

6. The system of claim 5, wherein the key setting information comprises spectrum setting information for setting the second frequency component for the generation of the universal communication signal, modulation setting information for setting frequency modulation for a sine wave and an envelope in a frequency frame of the universal communication signal, mode information for setting a modulation mode of the universal communication signal, and consortium setting information for setting frequency synthesis in the frequency frame of the universal communication signal.

7. The system of claim 6, wherein the modulation setting information comprises time information of the sine wave and the envelope, frequency information, and texture information of the envelope, in the frequency frame.

8. The system of claim 5, wherein the dictionary setting information comprises at least one piece of information among definition information for setting axiomatic definition data associated with a symbolic meaning of the frequency component of the universal communication signal, affinity information for setting etymologic affinity data of the axiomatic definition data, meaning information for setting a meaning of the axiomatic definition data, and order setting information for setting syntagma data of the axiomatic definition data.

9. The system of claim 5, wherein the tuning information comprises selection information of the second morphological feature, range information of the universal communication signal, and synchronization information for setting synchronization between the universal communication signal and the action signal.

10. The system of claim 1, further comprising:
a central communication processing unit (CCPU) to provide at least one user with a dictionary database list for downloading the at least one dictionary database, and to update the at least one dictionary database using user-created dictionary data received from the at least one user.

11. The system of claim 10, wherein the CCPU controls a connection of the at least one user to the system over a communication network, and controls a communication between the at least one user connected to the system.

12. The system of claim 10, further comprising:
a cloud computing service unit to store and manage one of the at least one dictionary database, the setting information, and the generated universal communication signal,
wherein the CCPU receives, from the cloud computing service unit, at least one piece of data among the at least one dictionary database, the setting information, information associated with the universal communication signal, the user-created dictionary data, and contents, over the communication network, and provides the cloud computing service unit with related information generated from the at least one piece of data being received.

13. The system of claim 1, wherein the applicator comprises:
a parameter extractor to set the parameter for controlling the generation of the universal communication signal, or to extract the parameter for controlling the generation of the universal communication signal from the predetermined setting information and to control the extracted parameter; and
a communicator to set the connection with the at least one user and to control the conversion into the action signal.

14. The system of claim 13, wherein the parameter extractor comprises:

a key setting unit to set and control the frequency component of the second morphological feature of the universal communication signal;
a dictionary setting unit to select the at least one dictionary database and to control the at least one dictionary database being selected; and
a tuning unit to set the second morphological feature.

15. The system of claim 13, wherein the communicator comprises:
a file setting unit to generate the setting information and to edit and control the generated setting information;
a state setting unit to set the conversion of the universal communication signal into the action signal; and
a connection setting unit to control the connection with the at least one user.

16. The system of claim 13, wherein the applicator further comprises:
a memory unit to store the extracted parameter, the setting information, and the dictionary information.

17. The system of claim 1, wherein the applicator comprises:
a modulation/demodulation module to modulate the universal communication signal of the second morphological feature and to demodulate the sensed input signal based on the setting information.

18. The system of claim 1, wherein the activator corresponds to a transceiver for at least one stand-alone device, and is attachable to and detachable from at least one object, and
the adaptor corresponds to the at least one stand-alone device corresponding to the at least one activator, respectively, and converts the generated universal communication signal into a data format corresponding to the action signal and transmits the action signal.

19. The system of claim 18, wherein the setting information comprises ON/OFF information of an input and an output in the at least one stand-alone device corresponding to the at least one adaptor, respectively.

20. The system of claim 1, wherein the activator comprises:
an input module to sense the input signal; and
an output module to output the action signal corresponding to the generated universal communication signal.

21. The system of claim 1, wherein the dictionary information comprises at least one piece of data among at least one axiomatic definition data of the frequency component, at least one combinatory etymologic affinity data of the axiomatic definition data, and at least one syntagma data of the axiomatic definition data.

22. A system for providing universal communication, the system comprising:
a universal communication provider to generate, in response to an input signal of a first morphological feature, a universal communication signal of a second morphological feature based on setting information using at least one dictionary database including dictionary information based on a frequency component, and to integrate the generated universal communication signal into an action signal; and
a dictionary evolution module to set at least one axiomatic definition data of the frequency component, and to construct and evolve the at least one dictionary database including at least one combinatory etymologic affinity data and at least one syntagma data of the axiomatic definition data being set.

23. The system of claim 22, wherein the dictionary evolution module computes a likelihood of second dictionary translation data to first dictionary translation data, the first dictionary translation data and the second dictionary translation data being produced by performing a translation process on first dictionary data and second dictionary data, respectively, based on the dictionary information of the at least one dictionary database, and the dictionary evolution module extracts an axiom or affinity between the first dictionary data and the second dictionary data based on the computed likelihood, and evolves the first dictionary data to the second dictionary data to evolve the at least one dictionary database.

24. The system of claim 22, wherein the dictionary evolution module comprises:

a recognition unit to extract and recognize the frequency component;

a definition unit to set the axiomatic definition data of the extracted frequency component;

an affinity analysis unit to analyze the etymologic affinity data of the axiomatic definition data being set;

a meaning setting unit to set a meaning of the axiomatic definition data being set; and an order analysis unit to analyze the syntagma data of the axiomatic definition data being set.

25. The system of claim 24, wherein the etymologic affinity data comprises derivation information and usage information of the axiomatic definition data.

26. The system of claim 24, further comprising:

a storage unit to store at least one piece of information among a user identification (ID) of at least one user, location information or dictionary ID of the at least one dictionary database, the dictionary information, and the generated universal communication signal.

27. A system for providing universal communication, the system comprising:

a processor;

a storage unit that stores at least one dictionary database including dictionary information based on a frequency component, and which is communicatively coupled to the processor, wherein the system generates and evolves the at least one dictionary database, generates a universal communication signal of a morphological feature including one frequency component selected from light, a sound, an electromagnetic wave, a language, and a vibration, based on setting information using the at least one dictionary database, and integrates the generated universal communication signal into an action signal, the system further comprising:

an applicator to generate the universal communication signal of the second morphological feature including one frequency component selected from light, a sound, an electromagnetic wave, a language, and a vibration, based on the setting information using the at least one dictionary database;

an activator to sense the input signal, to transmit the sensed input signal to the applicator, and to output the action signal corresponding to the generated universal communication signal; and an adaptor to convert the generated universal communication signal into a signal format corresponding to the action signal.

28. A system for providing universal communication, the system comprising:

a universal communication provider to generate a universal communication signal of a morphological feature including one frequency component selected from light, a sound, an electromagnetic wave, a language, and a vibration based on setting information using at least one dictionary database including dictionary information based on the frequency component, and to integrate the generated universal communication signal into an action signal; and a dictionary evolution module to set at least one axiomatic definition data of the frequency component, and to construct and evolve the at least one dictionary database including at least one combinatory etymologic affinity data and at least one syntagma data of the axiomatic definition data being set.

* * * * *